United States Patent
Ette

(10) Patent No.: US 12,202,435 B2
(45) Date of Patent: Jan. 21, 2025

(54) TRANSPORTATION VEHICLE, METHOD FOR A TRANSPORTATION VEHICLE AND COMMUNICATION SYSTEM FOR A TRANSPORTATION VEHICLE

(71) Applicant: VOLKSWAGEN AKTIENGESELLSCHAFT, Wolfsburg (DE)

(72) Inventor: Bernd Ette, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 50 days.

(21) Appl. No.: 18/310,148

(22) Filed: May 1, 2023

(65) Prior Publication Data

US 2023/0347846 A1 Nov. 2, 2023

(30) Foreign Application Priority Data

Apr. 29, 2022 (DE) ...................... 10 2022 204 235.2

(51) Int. Cl.
*B60R 25/24* (2013.01)
*B60R 25/01* (2013.01)
(Continued)

(52) U.S. Cl.
CPC ............ *B60R 25/243* (2013.01); *B60R 25/01* (2013.01); *B60R 25/2045* (2013.01); *G07C 9/00309* (2013.01); *G07C 2009/00793* (2013.01)

(58) Field of Classification Search
CPC ... B60R 25/01; B60R 25/2045; B60R 25/243; E05F 15/431; E05Y 2400/45;
(Continued)

(56) References Cited

U.S. PATENT DOCUMENTS 7,822,161 B2 10/2010 Lee et al.
9,679,430 B2 6/2017 O'Brien et al.
(Continued)

FOREIGN PATENT DOCUMENTS

DE 102016212447 A1 1/2018
DE 102018206571 A1 10/2019
(Continued)

OTHER PUBLICATIONS

Office Action; Japanese Patent Application No. 2023-074733; Mar. 12, 2024.

*Primary Examiner* — Omer S Khan
(74) *Attorney, Agent, or Firm* — Barnes & Thornburg LLP

(57) ABSTRACT

A transportation vehicle having an actuator for automatically adjusting a windowpane and/or a sliding roof of the transportation vehicle; a UWB system having a UWB transceiver and a first and a second antenna, each of which sends and receives UWB pulses; and a control device connected to the UWB system and the actuator to carry out a method based on channel impulse response measurements for detecting objects in a collision region by using the first antenna and the second antenna, and to send a signal that is based on a result of the detection method to interrupt an automatic adjustment of a windowpane and/or a sliding roof of the transportation vehicle to the actuator. Also disclosed is a method and communication system for a transportation vehicle.

15 Claims, 2 Drawing Sheets

(51) Int. Cl.
*B60R 25/20* (2013.01)
*G07C 9/00* (2020.01)

(58) Field of Classification Search
CPC ........... E05Y 2400/53; E05Y 2900/542; E05Y 2900/55; G01S 13/765; G01S 13/88; G01S 2013/466; G07C 2009/00793; G07C 9/00309

See application file for complete search history.

(56) References Cited

U.S. PATENT DOCUMENTS

| | | | |
|---|---|---|---|
| 10,179,568 B2 | 1/2019 | Hariri et al. | |
| 11,037,388 B2 | 6/2021 | DeLong et al. | |
| 2002/0179822 A1* | 12/2002 | Breed | G01S 17/04 250/221 |
| 2017/0212210 A1* | 7/2017 | Chen | G01S 5/06 |
| 2019/0169909 A1 | 6/2019 | Ikeda et al. | |
| 2019/0249476 A1 | 8/2019 | Pohl et al. | |
| 2020/0307635 A1 | 10/2020 | Hara et al. | |
| 2020/0309932 A1* | 10/2020 | Zeng | G07C 5/08 |
| 2020/0346618 A1* | 11/2020 | Steegmann | G07C 9/00309 |
| 2021/0027130 A1 | 1/2021 | Ette | |
| 2021/0277463 A1* | 9/2021 | Rothberg | H01S 3/10061 |
| 2022/0035017 A1 | 2/2022 | Ette | |
| 2022/0063647 A1* | 3/2022 | Caron | G06F 3/04886 |
| 2022/0091246 A1 | 3/2022 | Blomerius et al. | |
| 2022/0163655 A1 | 5/2022 | Sauer | |

FOREIGN PATENT DOCUMENTS

| | | |
|---|---|---|
| DE | 102020124444 A1 | 3/2022 |
| JP | 2017040083 A | 2/2017 |
| JP | 2018021387 A | 2/2018 |
| JP | 2022027637 A | 2/2022 |

\* cited by examiner

TRANSPORTATION VEHICLE, METHOD FOR A TRANSPORTATION VEHICLE AND COMMUNICATION SYSTEM FOR A TRANSPORTATION VEHICLE

PRIORITY CLAIM

This patent application claims priority to German Patent Application No. 10 2022 204 235.2, filed 29 Apr. 2022, the disclosure of which is incorporated herein by reference in its entirety.

SUMMARY

Illustrative embodiments relate to a transportation vehicle, in particular, a transportation vehicle having a UWB system configured to carry out a method based on channel impulse response (CIR) measurements and to interrupt an automatic adjustment of a windowpane and/or of a sliding roof by an actuator of the transportation vehicle on the basis of a result of the CIR measurements. In addition, illustrative embodiments relate to a method of a transportation vehicle and to a communication system for a transportation vehicle.

BRIEF DESCRIPTION OF THE DRAWINGS

The disclosed embodiments are explained below on the basis of the associated drawings, in which.

DETAILED DESCRIPTION

Figure 1:
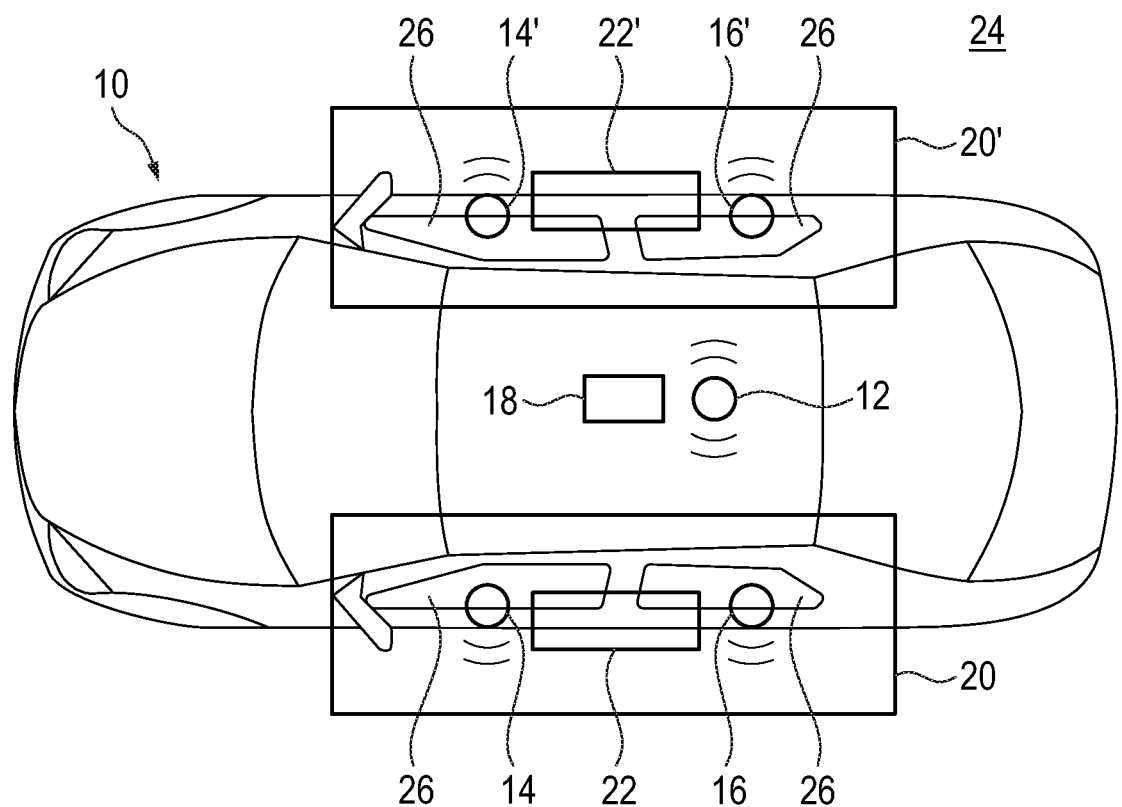
FIG. 1 shows a schematic representation of an exemplary embodiment of a disclosed transportation vehicle.
Figure 1:
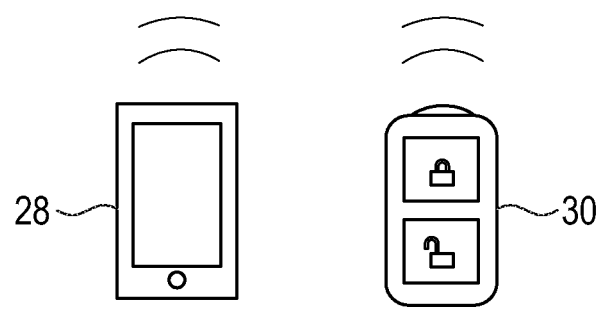

Modern transportation vehicles comprise a multiplicity of electronic systems that act in an assistive capacity for a user of the transportation vehicle in regard to various transportation vehicle functions. One example is electric window lifters. Instead of having to move the window up and down in a time-consuming manner by mechanical levers, electric window lifters involve the user simply operating an associated toggle switch or a key to take the window up or down. Electric window lifters equipped with a so-called automatic tap system are regularly installed, according to which the windowpane can be automatically opened or closed completely by briefly operating the toggle switch once.

Since electric window lifters usually move windowpanes with closing forces of up to 300 newtons—equivalent to a weight of up to 30 kg in the case of a windowpane having a thickness of 8 mm—electric window lifters without anti-trap protection can be a hazard, in particular, for children. By way of example, situations can arise in which a child traps his hand or his head between the closing windowpane and the vehicle door because he unintentionally flips the toggle switch of the electric window lifter. Many electric window lifters today are therefore equipped with anti-trap protection that is supposed to detect trapping and interrupt or even reverse the remainder of the closing operation for the windowpane.

Known solutions accomplish this by providing for a counterforce on the closing window that arises in relation to the direction of movement to be detected and for this to be taken as a basis for identifying trapping. After trapping has been identified, a reversal of movement of the actuator is initiated to open the windowpane again.

Solutions that use an arising counterforce as a measure to identify an instance of trapping can be produced at low cost today. Owing to ever more convex shapes of the windowpanes installed in transportation vehicles, for example, some of the known solutions are reaching their limits for physical reasons, which means that instances of trapping can occur that are not detected by the anti-trap protection.

Document DE 10 2020 124 444 A1 relates to a method for monitoring the interior and/or the exterior of a transportation vehicle. Against the background of the multiplicity of separate systems configured for accomplishing individual tasks that are installed in transportation vehicles, D1 teaches an improved solution for monitoring the interior and/or exterior of a motor transportation vehicle that requires no or only few additional components.

Document DE 10 2018 206 571 A1 relates to a sensor module of an adjusting part of a transportation vehicle. It refers to the problem that arises when there is an obstacle in the adjustment region of a tailgate. To prevent damage to the adjusting part and/or the obstacle as a result of the pivoting movement of the adjusting part, this disclosure reveals optical and capacitive sensors. Against this background, a solution is proposed that relates to a particularly suitable sensor module of an adjusting part of a transportation vehicle having reduced manufacturing costs and/or a reduced installation time compared to the known optical and capacitive sensors.

The subsequently published document US 2022/0163655 A1 relates generally to the detection of moving objects that react to a mean value of the magnitudes of a sum of collections of reflected predetermined patterns and a predetermined threshold value.

The disclosed embodiments are based on developing a transportation vehicle having anti-trap protection for electric window lifters that further reduces the occurrence of instances of trapping.

The disclosed embodiments are include a transportation vehicle, a method of a transportation vehicle and a communication system for a transportation vehicle.

One exemplary embodiment relates to a transportation vehicle, in particular, an automobile having an internal combustion, electric or hybrid engine. The transportation vehicle comprises an actuator for automatically adjusting a windowpane and/or a sliding roof of the transportation vehicle. The actuator may be electrically operable. An example of an actuator is an electric motor configured to lift windows.

The transportation vehicle likewise comprises an ultra-wideband system (UWB) having a UWB transceiver and having a first and having a second antenna, each of which is configured for sending and receiving UWB pulses. The UWB system likewise may comprise a second UWB transceiver. When two UWB transceivers are used, each of the two antennas may be equipped and controlled with its own transceiver. This permits the UWB system to be divided into functional UWB subsystems each comprising one of the transceivers and one of the antennas.

The UWB system, in particular, the UWB transceiver, is designed for sending and receiving signals in very wide frequency ranges, in particular, in a frequency range from 3.1 to 10.6 GHz, optionally in a frequency range from 3.5 to 9 GHz, particularly in a frequency range from 6 GHz to 8.5 GHz. The transmission power of the UWB pulses is low.

The bandwidth of the UWB system is at least 500 MHz and the UWB system, in particular, the UWB transceiver, may be designed for sending signals having a transmission power between 0.5 mW/−41.3 dBm/MHz. The UWB system, in particular, the UWB transceiver, is optionally designed in accordance with the IEEE 802.15.4 standard (in particular, the sections relating to the UWB PHY layer) and in accordance with the IEEE 802.15.4z standard. The variance of the signals over such wide frequency ranges means that UWB signals interfere with other radio signals only minimally. Furthermore, UWB transceivers can be used to transmit highly temporally localized transmission pulses with low full width at half maximum (FWHM). This is based on the high frequency width of the transmission pulses ($\Box E^* \Box t$>const.). UWB signals are therefore suitable for time-resolved time-of-flight measurements and allow the detection of objects with very high positional resolution.

The transportation vehicle also comprises a control device connected to the UWB system and the actuator. The control device is configured to carry out a method based on channel impulse response measurements (CIR measurements) for detecting objects in a collision region by using the first antenna and the second antenna. The collision region may be arranged between an open and/or a closing windowpane (sliding roof) and the vehicle door, or the vehicle frame. Information pertaining to the collision region may be stored in a storage unit of the transportation vehicle or of the UWB system.

The highly temporally localized UWB pulses mean that it is possible to extract information pertaining to the propagation path of received UWB pulses from the UWB pulses using the impulse response thereof that results from the influence of the surroundings on the transmitted UWB pulse. Influences of the surroundings are based on physical phenomena that deflect the UWB pulse from its geometrically prescribed path, such as, for example, refraction, diffraction, reflection or damping. It is possible to use just two antennas to scan the surroundings in a positionally-resolved manner by using the CIR measurements. As a result of repeated sending of UWB pulses via one of the antennas and on the basis of the impulse responses received by the second antenna, changes in the surroundings—for example, an object recently appearing in the region to be scanned—can be rendered visible in a positionally and temporally resolved manner by comparing the time-shifted impulse responses. This allows an object entering the collision region to be detected reliably. A constant and/or repetitive scanning of the surroundings by using CIR measurements may permit appropriate monitoring of the collision region.

By way of example, the CIR measurements comprise sending predefined signals or signal packets (so-called telegrams) between the (at least) two UWB antennas. In addition to a direct propagation path for the signal or the signal packets between the UWB antennas, there are a multiplicity of further propagation paths, which include reflections in the interior of the transportation vehicle, for example. Based on an adequate number and/or an arrangement of the UWB antennas in the transportation vehicle, these propagation paths allow almost the entire vehicle interior and parts of the vehicle exterior to be covered. It is obvious that the times of flight of the signals or signal packets differ along different propagation paths and change on the basis of the presence or absence of objects in or close to the propagation paths. The impulse shape (amplitude, phase et cetera) of the signals or signal packets is also influenced on the basis of the presence or absence of objects in or close to the propagation paths. The measurement of signals or signal packets transmitted along these propagation paths can therefore be used to infer the presence or absence of objects in or close to the propagation paths, in particular, in the predefined collision region.

The collision region may also be selected in such a way that at least the possible path of an individual one, a multiplicity or all of the windowpanes and/or the sliding roof is included. This allows reliable detection of an object, such as, for example, an arm or a head, between an open or closing windowpane and the vehicle door (vehicle frame) to identify a possible instance of trapping. In other words, the disclosed embodiment allows a possible instance of trapping in the windowpane or the sliding roof to be contactles sly identified before it actually occurs by virtue of the suitable choice of the collision region.

The control device is likewise configured to send a signal that is based on a result of the detection method to interrupt an automatic adjustment of a windowpane and/or a sliding roof of the transportation vehicle to the actuator. In other words, an instance of trapping identified according to the disclosure is taken as a basis for preventing a further adjustment of the windowpane and/or the sliding roof, and optionally initiating a reversal movement, by way of the signal sent from the control device to the actuator. The occurrence of instances of trapping is therefore reduced.

In a disclosed embodiment, there is provision for the control device to be configured to carry out the detection method before and/or during an automatic adjustment for closing the windowpane and/or the sliding roof by the actuator. This prevents the disclosed detection method from being carried out in situations in which it is not necessary. If the windowpane or the sliding roof is completely closed, for example, there is no risk of an instance of trapping. Costs and unnecessary wear can therefore be reduced.

The control device may be configured to receive an input command from a user for the automatic adjustment for closing the windowpane and/or the sliding roof by the actuator, to subsequently carry out the detection method and to send an enable signal that is based on a result of the detection method for closing the windowpane and/or the sliding roof to the actuator. This allows the actuator to be controlled to close the windowpane and/or the sliding roof only on the assumption of the collision region being free of objects. The occurrence of possible instances of trapping is therefore reduced further.

In another disclosed embodiment, there is provision for the UWB system to also comprise a third antenna configured for sending and receiving UWB pulses. The control device may be configured to carry out the method based on CIR measurements for detecting objects in the collision region by using the first, the second and the third antenna. The UWB system may comprise a third transceiver. There may be provision for the third antenna and the third transceiver to form a functional UWB subunit. A further antenna or a further functional UWB subunit increases the information content to be extracted from the impulse responses, for example, on the basis of the relative positional information pertaining to the three antennas in relation to one another. The reliability of the identification of an object in the collision space can therefore be improved and the occurrence of instances of trapping can be reduced further.

In a further disclosed embodiment, there is provision for the control device to be also configured to carry out a positioning method based on time-of-flight measurements by using the three antennas. The control device may be configured to use the time-of-flight measurements via the three antennas to determine a bearing (triangulation) of a detected object and the relative location thereof in relation to the transportation vehicle. Such a time-of-flight (ToF) measurement essentially involves a UWB pulse being transmitted from the control device via an antenna and the reflection of the UWB pulse from an object being received by the same antenna. The time between the transmission of the first UWB pulse and the reception of the reflected UWB pulse t2−t1 and the propagation speed of the UWB pulse, that is to say the speed of light, can be used to ascertain the distance d between the antenna of the module and the object according to d=((t2−t1)−☐tVB/2c). The use of highly time-resolved UWB signals allows a positional resolution of significantly below 1 meter. The triangulation allows the object to be determined in three dimensions in relation to the transportation vehicle.

The control device may additionally be configured to use the positioning method based on time-of-flight measurements to sense a gesture of a user in the gesture region. The gesture region may be situated at a predefined distance in front of a vehicle door, and information pertaining to the gesture region may be stored in a storage unit of the transportation vehicle or of the UWB system. The control device may be configured to compare a gesture sensed by the positioning method based on time-of-flight measurements against gestures stored in the storage unit and to perform the function associated with the gesture. By way of example, associated functions are locking or unlocking the transportation vehicle and opening or closing a windowpane, a multiplicity of windowpanes, a sliding roof, a tank cover flap and/or a tailgate of the transportation vehicle. In other words, the UWB system and the control device are configured to carry out both the detection method based on CIR measurements and the positioning method based on time-of-flight measurements using the same antennas. The disclosed detection method, therefore, allows both scanning of the collision region to prevent instances of trapping and scanning of the gesture region by the positioning method based on time-of-flight measurements to allow gesture control of the transportation vehicle. The same UWB system or the same UWB subsystems may be used for both described methods (detection and positioning), which means that the number of necessary UWB antennas or UWB subsystems can be kept down and costs can be saved. In principle, UWB antennas that are already present in the transportation vehicle can also be used for the disclosed embodiments.

The gesture region may be defined in the exterior of the transportation vehicle and the collision region may be defined in the interior and in the exterior of the transportation vehicle. The collision region may project from the windowpane or the sliding roof 10 cm into both the interior and the exterior of the transportation vehicle, for example, in a normal direction of the windowpane or the sliding roof. In other words, the collision region to be monitored is extended in a direction orthogonal to the direction of travel of the windowpane and/or the sliding roof. This allows not only objects immediately in the region of the direction of travel of the windowpane or the sliding roof to be detected, but also objects that could possibly enter the immediate region of the direction of travel of the windowpane or the sliding roof at a time in the near future. This allows more instances of trapping to be identified and the occurrence of instances of trapping to be reduced further.

In another disclosed embodiment, there is provision for the control device to be configured to use data that are obtained in the detection method based on CIR measurements and/or to use data about the windowpane and/or about the sliding roof of the transportation vehicle that are obtained in the above-described positioning method based on time-of-flight measurements to determine a degree of opening of the windowpane and/or the sliding roof. The control device may be configured to calculate a degree of opening from the differences between the positions of the windowpane and/or the sliding roof that are ascertained from the data obtained. This is a beneficial alternative to the known ascertainment of the degree of opening of a windowpane and/or the sliding roof.

To avoid repetition, a redundant description of the benefits and features of the method described below and the communication system described below that result from the description of the disclosed transportation vehicle in an analogous manner is dispensed with.

A further exemplary embodiment is a method of a transportation vehicle, wherein the transportation vehicle comprises an actuator for automatically adjusting a windowpane and/or a sliding roof of the transportation vehicle, a UWB system having a UWB transceiver and a first and a second antenna, each of which is configured for sending and receiving UWB pulses, and a control device connected to the UWB system and the actuator. The transportation vehicle may be a transportation vehicle having the features described above. The method comprises the following operations, specifically controlling the UWB system to carry out a method based on CIR measurements for detecting objects in a collision region and sending a signal that is based on a result of the detection method to interrupt an automatic adjustment of a windowpane and/or a sliding roof of the transportation vehicle to the actuator of the transportation vehicle.

In an exemplary embodiment of the disclosed method, there is provision for the UWB system to be controlled to carry out the detection method before and/or during an automatic adjustment for closing the windowpane and/or the sliding roof by the actuator.

In a further disclosed embodiment, there is provision for the UWB system to further comprise a third antenna configured for sending and receiving UWB pulses, and for the disclosed method to further comprise carrying out a positioning method based on time-of-flight measurements by using the three antennas.

The positioning method may be used to sense a gesture of a user in a gesture region.

In a further exemplary embodiment of the disclosed method, there is provision for an additional operation, specifically determining a degree of opening of a windowpane and/or the sliding roof of the transportation vehicle by using data that are obtained in the detection method based on CIR measurements and/or by using data about the windowpane and/or the sliding roof of the transportation vehicle that are obtained in a/the positioning method based on time-of-flight measurements.

The individual method operations of the disclosed method may also be one or more processes that run on one or more processors in one or more electronic computing devices and are produced when one or more computer programs are executed. The computing devices may be designed to cooperate with other components, in particular, a UWB system, to provide the functionalities described herein.

The instructions of the computer programs may likewise be stored in a memory, such as, for example, a RAM element. However, the computer programs can also be stored in a nonvolatile storage medium, such as, for example, a CD-ROM, a flash memory or the like.

A person skilled in the art will also see that the functionalities of multiple computers (data processing devices) may be combined or combined in a single device or that the functionality of a specific data processing device may be available in a manner distributed over a multiplicity of devices to carry out the disclosed method, without departing from the disclosed method.

A further exemplary embodiment relates to a computer program comprising commands that, when the program is executed by a computer, such as, for example, a control device of a transportation vehicle comprising an actuator for automatically adjusting a windowpane and/or a sliding roof of the transportation vehicle, a UWB system having a UWB transceiver and a first and a second antenna, each of which is configured for sending and receiving UWB pulses, cause the computer to carry out the disclosed method, in particular, a method based on CIR measurements for detecting objects in a collision region by using the UWB system, and to output a signal that is based on a result of the detection method to interrupt an automatic adjustment of a windowpane and/or a sliding roof of the transportation vehicle to the actuator of the transportation vehicle.

A further exemplary embodiment relates to a communication system for a transportation vehicle. The communication system comprises a UWB system having a UWB transceiver and a first, second and third antenna, each of which is configured for sending and receiving UWB pulses, and a control device connected to the UWB system and the actuator. The control device is configured to carry out a method based on CIR measurements for detecting objects in a collision region by using the first antenna and the second antenna and to send a signal that is based on a result of the detection method to interrupt an automatic adjustment of a windowpane and/or a sliding roof of the transportation vehicle to an actuator for automatically adjusting a windowpane and/or a sliding roof of the transportation vehicle. The transportation vehicle may be a transportation vehicle having the features described above.

In a further disclosed embodiment, there is provision for one of the UWB systems to be arranged in a mobile terminal or a vehicle key. By way of example, the first and second antennas of the UWB system are arranged in the transportation vehicle and the third antenna is arranged in the mobile terminal or the vehicle key. This allows a beneficial vehicle communication with a user via the mobile terminal thereof or the vehicle key thereof. The control device may be arranged in the transportation vehicle. The control device may be configured to use the UWB system to obtain information about the location, for example, the relative location, of the mobile terminal and/or the vehicle key in relation to the motor vehicle. By way of example, location information data can be sent from the mobile terminal or the transportation vehicle key by using UWB radio signals, or the control device ascertains the location of the mobile terminal or the vehicle key by using CIR measurements and/or by the positioning method based on time-of-flight measurements by using the UWB system. The UWB system of the mobile terminal or of the vehicle key, as a further antenna or as a further functional UWB subunit, may increase the information content that is to be extracted in the impulse responses, for example, on the basis of relative location information pertaining to the three antennas in relation to one another. The reliability of the identification of an object in the collision space can therefore be improved and the occurrence of instances of trapping can be reduced further, while the number of UWB systems or UWB subsystems installed in the transportation vehicle can be kept down.

The UWB system arranged in the mobile terminal or in the vehicle key may also be configured to send radio signals for authenticating a user to one or all of the other UWB systems. The control device may likewise be configured to send the signal that is based on the result of the positioning method on the basis of the received radio signals for authenticating the user. Authentication of the user allows different vehicle functions such as, for example, the gesture control or unlocking of an entry system for the transportation vehicle to be disabled for unauthorized users. In this respect, it is possible to prevent unauthorized users from being able to gain entry to the transportation vehicle.

Further exemplary embodiments result from the other features cited in the subclaims.

The various disclosed embodiments that are cited in this application may be combined with one another, unless stated otherwise on a case-by-case basis.

FIG. 1 shows a schematic representation of an illustrative transportation vehicle 10, in particular, a transportation vehicle having an internal combustion, electric or hybrid engine. The transportation vehicle 10 comprises an actuator (not shown) for automatically adjusting at least one windowpane 26 of the transportation vehicle 10. For the sake of simplicity, only one actuator for operating the four windowpanes 26 shown in FIG. 1 is described below. It goes without saying that there may also be provision for one actuator per windowpane 26 and one actuator for a sliding roof of the transportation vehicle 10.

The transportation vehicle 10 further comprises a UWB system 12, 14, 14', 16, 16' having a first, a second and a third antenna 12, 14, 16, each of which is configured for sending and receiving UWB pulses, and three transceivers (not shown) that are respectively associated with one of the three antennas 12, 14, 16. FIG. 1 also shows a fourth and a fifth antenna 14', 16' configured for sending and receiving UWB pulses. Operation of the fourth and fifth antennas 14', 16' is analogous to that of the second and third antennas 14, 16. The intention is to show merely by way of example that the disclosed embodiments are not restricted to one vehicle side of the transportation vehicle 10. Additional explanations relating to the fourth and fifth antennas 14', 16' are therefore dispensed with.

By way of illustration, the first antenna 12 is arranged in the roof lining. The second and third antennas 14, 16 are each arranged below a moving windowpane 26 in the front and rear left-hand vehicle doors of the transportation vehicle 10. The three antennas 12, 14, 16 are connected to a control device 18 that is connected to the (at least one) actuator. By way of example, the control device 18 is arranged in the roof lining of the transportation vehicle 10 in proximity to the first antenna 12. The relative location of the three antennas 12, 14, 16 is stored in a storage unit (not shown) of the control device 18. The storage unit additionally stores information relating to a collision region 20, 20' and a gesture region 22, 22'.

Under the control of the control device 18, the UWB system 12, 14, 16 is designed to carry out a method based on channel impulse response measurements (CIR measurements) for detecting objects in the collision region 20, 20' by using the first, second and third antennas 12, 14, 16. To this end, the UWB system 12, 14, 16, under the control of the control device 18, transmits a highly temporally localized UWB pulse via, by way of example, the first antenna 12. The UWB pulse is deflected from its geometrically prescribed path by the surroundings. Depending on the respective influence of the surroundings on the UWB pulse, time-delayed portions of the UWB pulse transmitted by the first antenna 12 reach the second and third antennas 14, 16. The UWB pulse received in such a time-resolved manner contains information pertaining to the propagation paths of the UWB pulse as an impulse response that is dependent on the surroundings, the information being able to be extracted by the control device 18. In other words, this allows OR measurements to be used to scan the surroundings and perceive changes in the surroundings in a positionally resolved manner. As a result of repeated sending of UWB pulses via one of the antennas 12, 14, 16 and on the basis of the impulse responses received by the respective other antennas 12, 14, 16, changes in the surroundings are rendered visible in a positionally and temporally resolved manner by comparing the time-shifted impulse responses. According to the disclosed embodiments, this is utilized to scan the collision region 20, 20'.

The collision region 20, 20' is chosen such that it forms a three-dimensional space around the moving windowpanes 26 of the transportation vehicle 10 that is intersected by the respective windowpane 26 along the direction of travel of the respective windowpane 26 and projects from the respective windowpane 26 10 cm into both the exterior 24 and the interior of the transportation vehicle. In the event of a closing operation for one of the windowpanes 26 of the transportation vehicle 10, the control device 18 uses the UWB system 12, 14, 16 to monitor the collision region 20, 20' until the closing operation is complete or has been interrupted. In this way, potential instances of trapping are identified in the collision region. Since an instance of trapping is fundamentally able to occur only if a windowpane 26 is being closed, the detection method based on CIR measurements takes place only during or before the closing operation for the windowpane 26.

If such an instance of trapping is identified by the control device 18, the control device 18 sends a signal to interrupt the automatic adjustment of the closing windowpane 26 of the transportation vehicle 10 to the actuator. The control device 18 is configured for this purpose and appropriately connected to the actuator. As a result, the identified instance of trapping can be prevented without the object needing to touch the windowpane 26 to produce a counterforce. In this respect, potential instances of trapping can be prevented even before they occur.

The control device 18 and the UWB system 12, 14, 16 are further configured to carry out a positioning method based on time-of-flight measurements by using the three antennas 12, 14, 16. This allows a gesture of a user for controlling vehicle functions that is performed in the gesture region 22, 22' to be sensed by the control device 18. To this end, the three antennas 12, 14, 16 are used to transmit UWB pulses, and a reflection from the object performing the gesture, for example, a hand of the user, is received again by the same antenna 12, 14, 16 in each case to determine a distance between the respective antenna 12, 14, 16 and the object. Position determination for the object is then performed by triangulation.

After the sensed gesture has been compared against gestures stored in the storage unit 18 and a match has been found, vehicle functions corresponding to the gestures are performed. By way of example, the user of the transportation vehicle 10 can use one gesture to unlock the doors of the transportation vehicle 10 and can use another gesture to open or close one or all of the windowpanes 26. The control device 18 may be configured to distinguish between the collision region 20, 20' and the gesture region 22, 22' and therefore to undertake two different functions, namely anti-trap protection and gesture control, for the transportation vehicle 10 by using the same antennas 12, 14, 16.

In addition, the disclosed transportation vehicle 10 has a further function, specifically authentication of the user, which is performed by the UWB system 12, 14, 16 under the control of the control device 18 and a UWB system of a mobile terminal 28 or a vehicle key 30. UWB pulses are used to send authentication data about the UWB system 12, 14, 16 of the transportation vehicle 10 to the control device 18 and to compare the data with authentication data stored in the storage unit. Only after comparison that results in a match does the control device 18 enable gesture sensing or control. The antennas 12, 14, 16 can thus also be used for a third function, specifically preventing unauthorized users from being able to gain entry to the transportation vehicle.

Figure 2:
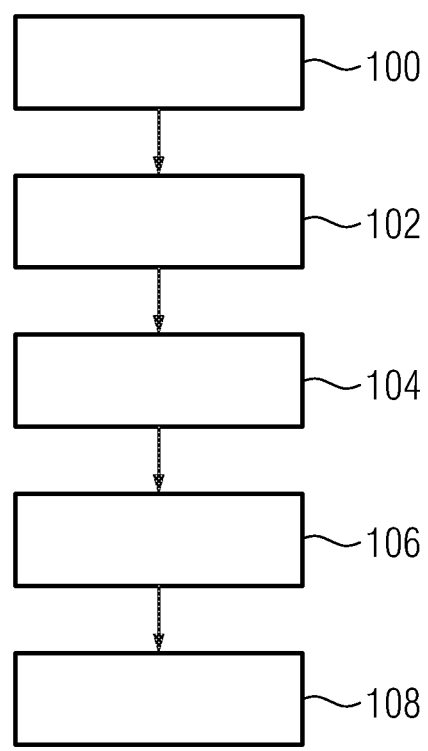
FIG. 2 shows a schematic representation of an exemplary embodiment of a disclosed method.

FIG. 2 shows a schematic representation of an illustrative embodiment of a disclosed method of a transportation vehicle 10. A first method operation at 100 comprises carrying out a positioning method based on time-of-flight measurements by using the three antennas 12, 14, 16, and using the positioning method to sense a gesture of a user in a gesture region 22, 22'. By way of example, a gesture performed by the user for closing a windowpane 26 is ascertained by way of comparison against gestures stored in a storage unit.

A second operation at 102 of the method of the transportation vehicle 10 comprises the transportation vehicle 10 using the UWB system 12, 14, 16 to receive radio signals for authenticating a user from a UWB system of a mobile terminal 28 or of a vehicle key 30 and authenticating the user by comparison against authentication data stored in a storage unit.

A third method operation at 104 of the method of the transportation vehicle 10 comprises successful authentication of the user being followed by a signal to close the window 26 being sent to an actuator for automatically adjusting the window 26.

A fourth operation at 106 comprises carrying out a method based on OR measurements for detecting objects in a collision region 20, 20' by using the first, second and third antennas 12, 14, 16. The collision region 20, 20' may be stored in the storage unit.

In this illustrative embodiment shown for the method of a transportation vehicle 10, a fifth operation at 108 comprises sending a signal that is based on a result of the detection method to interrupt an automatic adjustment of the windowpane 26 to the actuator for automatically adjusting the windowpane 26. In particular, the result of the detection method comprises an identified instance of trapping that is supposed to be prevented by sending the signal to the actuator. The interruption signal may additionally comprise a signal to reverse the movement of the actuator.

LIST OF REFERENCE SIGNS

10 transportation vehicle
12 first antenna
14 second antenna
14' fourth antenna
16 third antenna
16' fifth antenna
18 control device
20, 20' collision region
22, 22' gesture region
24 exterior of the transportation vehicle
26 windowpane
28 mobile terminal
30 vehicle key
100 first method operation
102 second method operation
104 third method operation 106 fourth method operation
108 fifth method operation

The invention claimed is:

1. A transportation vehicle including an actuator safety system for detecting objects within a collision region that is a three-dimensional space surrounding a windowpane or a sliding roof of the transportation vehicle, the actuator safety system comprising:
   an actuator for automatically adjusting of the windowpane or the sliding roof of the transportation vehicle;
   an ultra wide band system having an ultra wide band transceiver and first and second antennas, each of which being configured for sending and receiving ultra wide band pulses; and
   a computer processor-based controller connected to the ultra wide band system and the actuator and configured to:
      detect objects in the collision region using the first and second antennas by transmitting ultra wide band pulses by at least one of-the first or second antennas and based on measurement of channel impulse responses detected by the first or second antennas for the transmitted ultra wide band pulses, and
      transmit a signal based on a result of the detection to interrupt the automatic adjustment of the windowpane the sliding roof of the transportation vehicle to the actuator,
      wherein at least one of the first or second antennas of the ultra wide band transceiver is controlled to transmit temporally localized transmission pulses with low full width at half maximum, wherein the measurements of the channel impulse responses to the transmitted ultra wide band signals are analyzed to produce time-resolved time-of-flight measurements for object detection that provides positional and temporal resolution of the collision region by comparing a plurality of time-shifted channel impulse responses.

2. The transportation vehicle of claim 1, wherein the computer processor-based controller performs the detection of before or during an automatic adjustment for closing the windowpane or the sliding roof by the actuator.

3. The transportation vehicle of claim 1, wherein the ultra wide band system comprises a third antenna for sending and receiving ultra wide band pulses.

4. The transportation vehicle of claim 3, wherein the computer processor-based controller is further configured to perform positioning operations for determining a position of a detected object based on time-of-flight measurements using the first, second and third antennas, wherein ultra wide band pulses are transmitted and reflection of the transmitted ultra wide band pulses are received to determine bearing of a detected object.

5. The transportation vehicle of claim 4, wherein the computer processor-based controller is configured to sense a gesture of a user in a gesture region using the positioning operations based on the time-of-flight measurements.

6. The transportation vehicle of claim 5, wherein at least one of:
   the gesture region is in the exterior of the transportation vehicle,
   the collision region is in the interior and in the exterior of the transportation vehicle, or
   information pertaining to the gesture region and pertaining to the collision region is stored in a storage unit of the transportation vehicle.

7. The transportation vehicle of claim 1, wherein the computer processor-based controller uses at least one of data obtained in the detection operation based on the channel impulse response measurements or data about the windowpane or the sliding roof of the transportation vehicle obtained in positioning operations performed based on time-of-flight measurements to determine a degree of opening of the windowpane or the sliding roof.

8. A method for detecting objects in a collision region of a transportation vehicle that is a three-dimensional space surrounding a windowpane or a sliding roof of the transportation vehicle, wherein an actuator is configured to automatically adjust the windowpane or the sliding roof of the transportation vehicle, the method comprising:
   controlling an ultra wide band system of the transportation vehicle to perform object detection based on measurement of channel impulse responses performed by first and second antennas of the ultra wide band system, wherein the channel impulse responses are received by at least one of the first or second antennas in response to transmission of ultra wide band pulses by at least one of the first or second antennas; and
   transmitting a signal to the actuator of the transportation vehicle based on a result of the object detection to interrupt the automatic adjustment of the windowpane or the sliding roof of the transportation vehicle,
   wherein at least one of the first or second antennas of the ultra wide band transceiver is controlled to transmit temporally localized transmission pulses with low full width at half maximum, wherein the measurements of the channel impulse responses to the transmitted ultra wide band signals are analyzed to produce time-resolved time-of-flight measurements for object detection that provides positional and temporal resolution of the collision region by comparing a plurality of time-shifted channel impulse responses.

9. The method of claim 8, wherein the ultra wide band system is controlled to perform object detection at least one of before or during an automatic adjustment for closing the windowpane or the sliding roof by the actuator.

10. The method of claim 8, wherein the ultra wide band system further comprises a third antenna for sending and receiving ultra wide band pulses, and the method further comprises performing positioning operations for determining a position of a detected object based on time-of-flight measurements by using the first, second and third antennas, wherein ultra wide band pulses are transmitted and reflection of the transmitted ultra wide band pulses are received to determine bearing of the detected object.

11. The method of claim 10, wherein the positioning operations are used to sense a gesture of a user in a gesture region.

12. The method of claim 8, further comprising determining a degree of opening of the windowpane or the sliding roof of the transportation vehicle based on data obtained in the object detection operations based on at least one of the channel impulse response measurements or data about the windowpane or the sliding roof of the transportation vehicle that are obtained in the positioning operations based on the time-of-flight measurements.

13. A communication system for a transportation vehicle for communicating detection of objects within a collision region that is a three-dimensional space surrounding a windowpane or a sliding roof of the transportation vehicle to an actuator of the transportation vehicle configured to automatically adjust at the windowpane or the sliding roof of the transportation vehicle, the communication system comprising:
- an ultra wide band system having an ultra wide band transceiver and first, second and third antennas, each of which being configured to send and receive ultra wide band pulses, and
- a computer processor-based controller connected to the ultra wide band system and the actuator, the computer processor-based controller being configured to:
  - perform object detection in the collision region by transmitting ultra wide band pulses by at least one of the first or second antennas and based on measurement of channel impulse responses detected by at least one of the first or second antennas for the transmitted ultra wide band pulses, and
  - transmit a signal to the actuator based on a result of the object detection to interrupt the automatic adjustment the windowpane or the sliding roof of the transportation vehicle to an actuator for automatically adjusting the windowpane or the sliding roof of the transportation vehicle,
  - wherein at least one of the first, second or third antennas of the ultra wide band transceiver is controlled to transmit temporally localized transmission pulses with low full width at half maximum, wherein the measurements of the channel impulse responses to the transmitted ultra wide band signals are analyzed to produce time-resolved time-of-flight measurements for object detection that provides positional and temporal resolution of the collision region by comparing a plurality of time-shifted channel impulse responses.

14. The communication system of claim 13, wherein the third antenna of the ultra wide band system is included in a mobile terminal or a vehicle key for the transportation vehicle.

15. The communication system of claim 14, wherein the third antenna of the ultra wide band system included in the mobile terminal or the vehicle key transmits radio signals for authenticating a user to other ultra wide band systems, and wherein the computer processor-based controller transmits the user authentication signal based on a result of positioning operations performed based on measured channel impulse responses detected by at least one of the first, second or third antennas for the transmitted ultra wide band pulses.

* * * * *